United States Patent [19]

Kulha

[11] Patent Number: 4,899,585
[45] Date of Patent: Feb. 13, 1990

[54] LIQUID LEVEL DETECTOR AND METHOD FOR A VAPOR DEPOSITION CONTAINER

[75] Inventor: Edward Kulha, Santa Clara, Calif.

[73] Assignee: Semi-Gas Systems, Inc., San Jose, Calif.

[21] Appl. No.: 221,277

[22] Filed: Jul. 19, 1988

[51] Int. Cl.[4] ............................................... G01F 23/02
[52] U.S. Cl. ........................................ 73/293; 340/619
[58] Field of Search ............................ 73/293; 340/619

[56] References Cited

U.S. PATENT DOCUMENTS

| | | | |
|---|---|---|---|
| 3,448,616 | 6/1969 | Wostl et al. | 73/293 |
| 3,834,235 | 9/1974 | Bouton et al. | 73/293 |
| 4,038,650 | 7/1977 | Evans et al. | 73/293 |
| 4,132,899 | 1/1979 | Shigemasa et al. | 73/293 |
| 4,179,623 | 12/1979 | Jacobsen | 73/293 |
| 4,286,464 | 9/1981 | Tauber et al. | 73/293 |
| 4,346,294 | 8/1982 | Albaugh et al. | 250/227 |
| 4,354,180 | 10/1982 | Harding | 73/293 |
| 4,468,567 | 8/1984 | Sasano et al. | 73/293 |
| 4,713,552 | 12/1987 | Denis et al. | 73/293 |
| 4,782,226 | 11/1988 | Jeffries et al. | 250/227 |

FOREIGN PATENT DOCUMENTS

| | | | |
|---|---|---|---|
| 2036326 | 6/1980 | United Kingdom | 73/293 |
| 2171796 | 9/1986 | United Kingdom | 73/293 |

Primary Examiner—William A. Cuchlinski, Jr.
Assistant Examiner—Thomas B. Will
Attorney, Agent, or Firm—Thomas E. Schatzel

[57] ABSTRACT

An optical probe is sealingly mounted in an access port of a pressurized container. The probe comprises a glass rod of a predetermined thickness having a conical end tip. An optical transmitter and receiver is connected to the glass rod. The fiber optic transmitter and receiver sends visible red light down the glass rod. When the liquid level inside the container drops below the end tip of the glass rod, reflected light will be received from the glass rod and detected.

10 Claims, 1 Drawing Sheet

U.S. Patent     Feb. 13, 1990     4,899,585
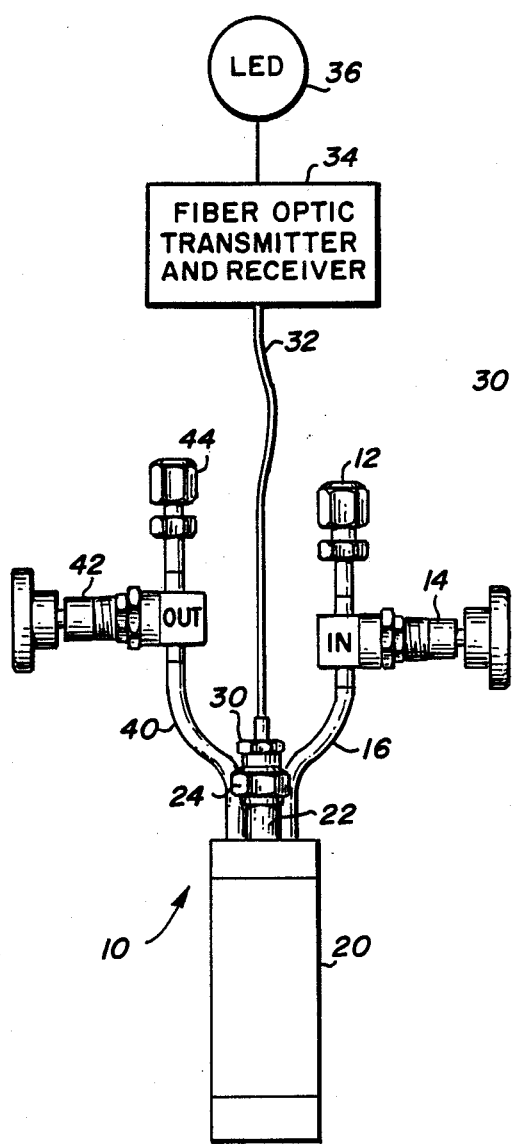
Fig_1
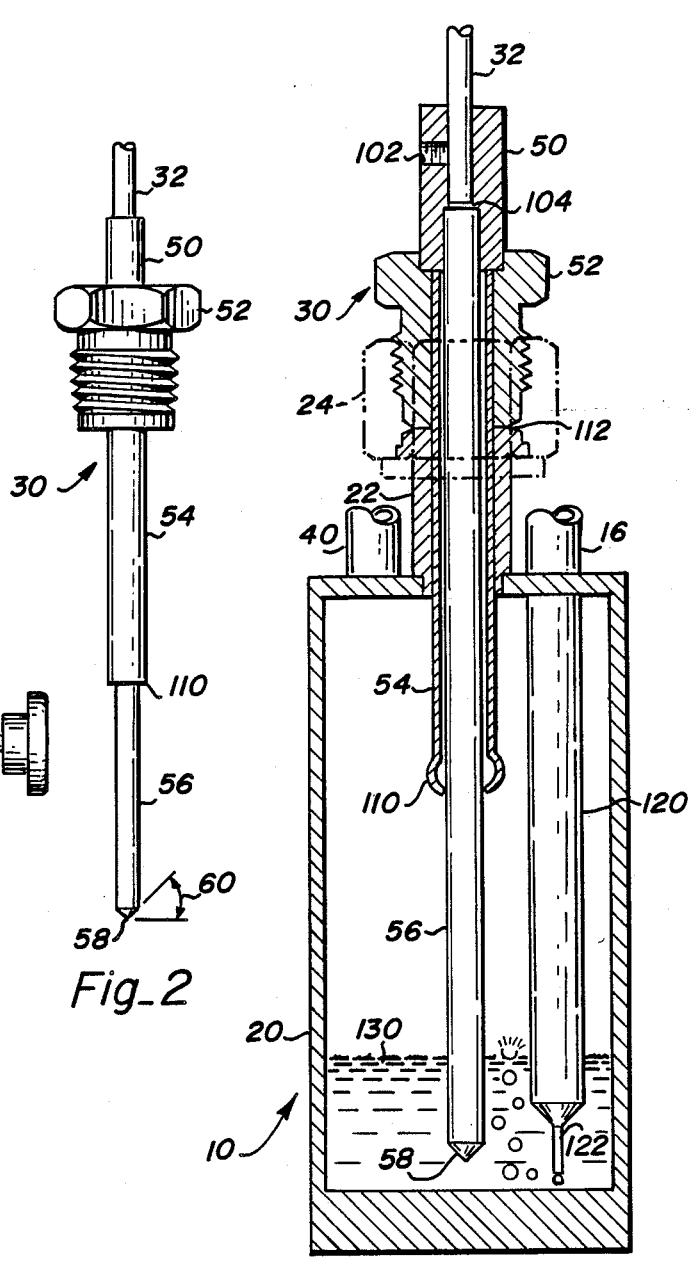
Fig_2
Fig_3

LIQUID LEVEL DETECTOR AND METHOD FOR A VAPOR DEPOSITION CONTAINER

BACKGROUND OF THE INVENTION

1. Field of the Invention

The present invention relates generally to liquid level detectors and more specifically to liquid level detectors for use with volatile liquids in pressurized environments.

2. Description of the Prior Art

Many chemical processes today involve hazardous or volatile chemicals. These chemicals must sometimes be used at elevated pressures and in sealed containers. The sealed containers make it difficult for a human operator to determine when the supply of chemicals in the container has been depleted.

The use of volatile liquid chemicals in pressurized containers is quite common in the semiconductor industry. One process for making wafers is known as metal organic chemical vapor deposition (MOCVD). Volatile chemicals such as trimethylgallium are used. These types of chemicals must be sealed in a container to exclude air because they burst into flame upon contact with air. In addition, some of these liquids are quite toxic. A carrier gas, such as hydrogen, is introduced into the container through a dip tube and bubbled through the chemical liquid producing a vapor. This vapor is evacuated from the container and used for vapor deposition on the wafer. All of the chemical liquid in the container is eventually converted to vapor and evacuated.

In order to maintain the constant production of wafers during the process, the liquid chemical must be replaced before it is exhausted. However, the pressurized sealed containers cannot be opened and inspected in an air atmosphere. The human operators must wait until the flow of carrier gas ceases to contain any of the liquid chemical, possibly fouling a whole process run, before replacing the container.

Liquid level detectors are known in the prior art. One such example is U.S. Pat. No. 4,201,914, issued to Benno Perron. However, these prior art liquid detector systems are made for use in open air systems and are not adapted for use in sealed, pressurized environments, especially with volatile liquids.

SUMMARY OF THE PRESENT INVENTION

It is therefore an object of the present invention to provide a liquid level detector for use with volatile liquids in sealed containers.

It is another object of the present invention to provide a liquid level detector which minimizes process time and product losses.

Briefly, in a preferred embodiment, the present invention includes a pressurized container for holding chemical liquids. The container has a plug member which sealingly fits over an access port. A tube passes through the plug and into the container. A glass rod is sealingly mounted inside the tube and extends into the container. The glass rod has a conical end section.

An optical transmitter and receiver is connected to the glass rod by a fiber optic bundle. The transmitter and receiver send visible red light down the glass rod. If liquid is in contact with the conical end section, then the light is dispersed. If liquid is not in contact with the conical end section, then the light is reflected back up the glass rod and is detected by the optical transmitter and receiver.

An advantage of the present invention is that it provides a liquid level detector for use with volatile liquids in sealed containers operating under pressure.

It is another advantage of the present invention in that it provides a liquid level detector which minimizes process time and product losses.

These and other objects and advantages of the present invention will no doubt become obvious to those or ordinary skill in the art after having read the following detailed description of the preferred embodiment which is illustrated in the various drawing figures.

IN THE DRAWINGS

FIG. 1 is a front view of a liquid level detection device in accordance with the present invention;

FIG. 2 is a front view of a probe of the present invention; and

FIG. 3 is a cross-sectional view of a portion of the device of FIG. 1.

DETAILED DESCRIPTION OF THE PREFERRED EMBODIMENT

FIG. 1 shows a liquid level detection device of the present invention and is designated by the general reference number 10. A pipe connector 12 is connected to a pressure isolation valve 14. Valve 14 is connected to an inlet pipe 16. Pipe 16 is connected to a semiconductor grade metal organic (SGMO) container 20. Such containers are typically made of stainless steel.

Container 20 has an access port tube 22 through which an optic probe may be inserted. A connector nut 24 is attached to the end of tube 22. Nut 24 may be a Cajon VCR type nut. An optical probe 30 is inserted through and is sealingly attached to tube 22 by means of nut 24. A flexible fiber optic bundle 32 connects probe 30 with a fiber optic transmitter and receiver (FOTR) 34. FOTR 34 produces light in the visible red range. Although the preferred embodiment uses an FOTR which utilizes visible red light other FOTRs which utilize other types of visible light or infrared light may also be used. Such FOTRs are manufactured by Banner Engineering Corporation. A light emitting diode (LED) 36 is electrically connected to FOTR 34.

An outlet pipe 40 is connected to container 20. A pressure isolation valve 42 is connected to pipe 40. Valves 14 and 42 may be Parker Bellows Valves. A pipe connector 44 is attached to valve 42.

FIG. 2 shows a front view of the optic probe 30. Probe 30 comprises a ferrule 50 for receiving the fiber optic bundle 32. Ferrule 50 is fitted to a plug member 52. Plug member 52 is shaped to mate and seal with nut 24 and tube 22. An optic tube 54 is welded to plug 52. A Pyrex glass rod 56 is shaped to fit inside tube 54. Glass rod 56 has an outer diameter of greater than 0.200 inches and in the preferred embodiment, has an outer diameter of 0.235 inches. Rod 56 has a conical tip 58 which has an angle 60 of approximately forty-five degrees relative to the horizontal.

FIG. 3 shows a cross-sectional view of a portion of the device 10 in FIG. 1. The fiber bundle 32 is held in place inside ferrule 50 by means of an Allen head screw 102. Plug 52 and tube 54 are typically made of stainless steel and are welded together. Glass rod 56 is then inserted inside tube 54 until it abuts a countersunk portion 104 of ferrule 50. Rod 56 is sealed to tube 54 by means of a glass-to-metal bond 110. The bond 110 is formed by means of a glass-to-metal high vacuum seal at 1000° C. temperature. This seal actually attaches the glass to the outer oxide layer of the metal of tube 54. Other types of high pressure glass seals could also be used.

Probe 30 is inserted into tube 22 and is attached by means of nut 24. A metal gasket 112 is placed between plug 52 and tube 22 to form a helium leak tight seal. A dip tube 120 is connected to inlet pipe 16 and extends to the bottom of container 20 and has a nozzle 122 at its end.

Device 10 may be detached from a processing system by disconnecting connectors 12 and 44. The system 10 may then be isolated in an air free environment for purposes of filling the container 20. Probe 30 is removed from the tube 22 and liquid chemical may be added to container 20 through tube 22 or can be filled through valves 12 or 44. System 10 may then be connected back into a processing system.

In operation, valves 14 and 42 are opened and a carrier gas enters container 20 through inlet pipe 16. The gas goes through dip tube 120 and bubbles up through the chemical liquid in the container. See FIG. 3. A vapor is formed which flows out of the container 20 through outlet pipe 40. As the carrier gas transports the liquid out of the container, the liquid level 130 begins to fall.

FOTR 34 constantly sends a visible red beam of light down the transmitting fibers of bundle 32. The bundles 32 abut glass rod 56. The light is conducted down rod 56 by being bounced off the side walls of the rod until the light reaches the conical tip 58.

If conical tip 58 is covered by liquid, then the light is dispersed into the liquid. However, as the liquid level 130 drops below tip 58, the light is reflected back up rod 56. This reflective light is conducted to FOTR 34 by the receiving fibers of bundle 32. FOTR 34 detects the reflected light and triggers a warning device such as LED 36 to let the operator know that the liquid chemical is nearing depletion.

Gas bubbling systems have some problems due to the unstable surface of the liquid. The bubbling action creates a wide zone where there is a frothy combination of both liquid and gas. This makes the detection of the liquid level difficult. In order to prevent this, the FOTR 34 of the present invention is equipped with a delay, e.g. one second. This ensures that the LED 36 is turned on only when liquid level 130 actually passes tip 58.

Another advantage of the present invention is that it avoids contamination of the system. Typical light conducting rods have a cladded outer shell in order to reflect the light internally and keep the light from passing out of the sidewall of the rod. However, elements in the cladded material, such as lead, can enter the system and become a source of contamination. The present invention uses a Pyrex glass rod having an outer diameter of at least 0.200 inches. It has been found that this diameter allows the visible light to be reflected internally without the need for cladding. The Pyrex glass is a noncontaminating material and because the probe rod is made completely of this material there is no danger of contaminating the system. The present invention utilizes visible red light in the preferred embodiment because this light provides the present invention with greater sensitivity than infrared when used with the noncladded probe.

Another advantage of the present invention is that it provides a very accurate measure of the level of the liquid. By varying the length of glass rod 56 it is possible to set the liquid level detector to indicate the liquid level at any desired elevation from the top of the container 20.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A liquid level detector for a vapor deposition container comprising:
   a pressurized container for storing a supply of liquid chemical, the container having an inlet port for delivering a carrier gas to said liquid, and having an outlet port for discharging said carrier gas;
   a glass rod having no outer cladding, extending through and hermetically sealed to the container, the rod having a conically shaped end; and
   a fiber optic transmitter and receiver optically connected to the glass rod for transmitting a beam of light and for detecting a reflected light beam when said glass rod is not in contact with said liquid.

2. The device of claim 1 wherein,
   the glass rod has an outer diameter of greater than 0.200 inches.

3. The device of claim 1 wherein,
   the glass rod is sealingly connected to the container by means of a high vacuum glass-to-metal seal.

4. The device of claim 1 further including,
   a light emitting device connected to the fiber optic transmitter and receiver for receiving a signal from the fiber optic transmitter and receiver indicative of the level of liquid in the container and emitting light in response thereto; and
   the fiber optic transmitter and receiver includes means for sending said signal a predetermined period of time after detecting said reflected light beam.

5. A liquid level detector for a vapor deposition container comprising:
   a pressurized container for storing a supply of liquid chemical, the container having an inlet port for delivering a carrier gas to said liquid, an outlet port for discharging said carrier gas, and a chemical fill port;
   a plug shaped to fit over and hermetically seal with said chemical fill port;
   a glass rod having no outer cladding, extending through and hermetically sealed to said plug, said rod having a conically shaped end; and
   a fiber optic transmitter and receiver optically connected to the glass rod for transmitting a beam of light and for detecting a reflected light beam when said glass rod is not in contact with said liquid.

6. The device of claim 5 wherein,
   said chemical fill port comprises a tube extending out of the container and a nut attached to the end of said tube; and
   the plug is shaped to mate and seal with said nut such that a metal seal is held between the plug and said tube.

7. The device of claim 5 wherein,
   the glass rod has an outer diameter of greater than 0.200 inches.

8. The device of claim 5 wherein,
the glass rod is sealingly connected to the plug by means of a high vacuum glass-to-metal seal.

9. The device of claim 5 further including,
a light emitting device connected to the fiber optic transmitter and receiver for receiving a signal from the fiber optic transmitter and receiver indicative of the level of liquid in the container and emitting light in response thereto; and
wherein, the fiber optic transmitter and receiver include means for sending said signal a predetermined period of time after detecting said reflected light beam.

10. A method for detecting the liquid level in a vapor deposition container comprising the steps of:

filling a pressurized container with a liquid chemical;
conducting a carrier gas through said liquid chemical in the container;
generating a beam of light;
conducting said beam of light inside said container by means of a glass rod, said glass rod having no outer cladding;
directing said beam of light to a tip of said glass rod, said tip being of conical shape;
reflecting said beam of light back along said glass rod if said liquid is not in contact with said tip; and
detecting said beam of light outside said container and sending a signal to a warning device if a predetermined period of time has passed since said beam of light has been detected.

* * * * *